Feb. 23, 1971   G. FONDA-BONARDI   3,564,850
FLUID-DYNAMIC ENGINE
Filed Feb. 11, 1969
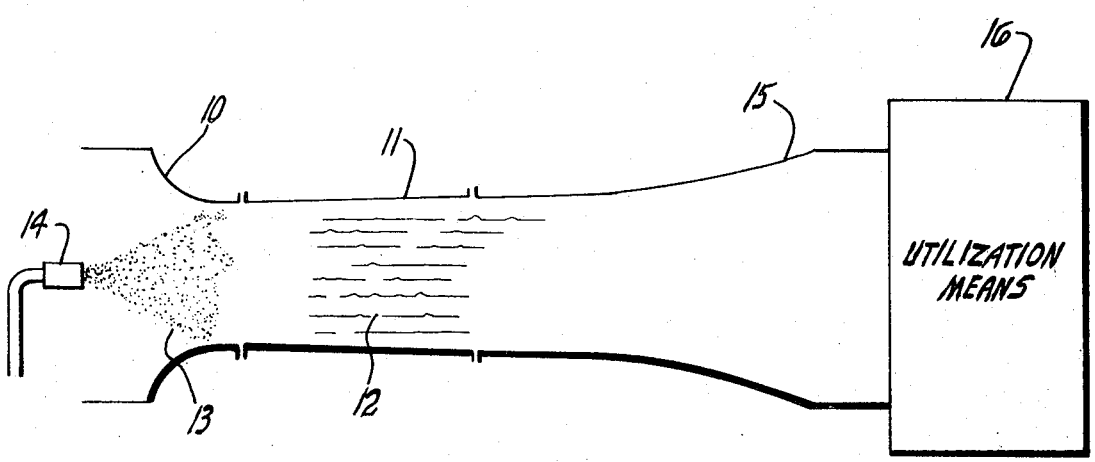
INVENTOR.
GIUSTO FONDA-BONARDI
BY
Christie, Parker & Hale
ATTORNEYS

United States Patent Office 3,564,850
Patented Feb. 23, 1971

3,564,850
FLUID-DYNAMIC ENGINE
Giusto Fonda-Bonardi, Los Angeles, Calif., assignor of six and one-half percent each to Robert S. Estes, Los Angeles, and Edward S. Merrill, Palm Springs, eight percent each to Emmett Steele and Jay Kurtz, nine percent to James Linahan, two percent to Carl Clement, all of Los Angeles, and one percent to Royal M. Galvin, Pacific Palisades, Calif.
Filed Feb. 11, 1969, Ser. No. 798,367
Int. Cl. F01k 3/18; F02k 1/00
U.S. Cl. 60—59                    9 Claims

ABSTRACT OF THE DISCLOSURE

This invention relates to a fluid-dynamic engine wherein a gas is accelerated through the engine at the speed of sound at the sonic speed of the gas and imparting energy to the gas while maintaining it at the sonic speed. The engine may comprise a duct having a sonic duct section interposed between convergent and divergent sections so that it is successively accelerated to the sonic speed through the convergent section and moves through the sonic section at the sonic speed.

---

This invention relates to fluid-dynamic engines defined as devices in which thermal energy is supplied to a gaseous working fluid, partially transformed into kinetic energy of the working fluid, and fiinally utilized by transforming the kinetic energy either in external work through a turbine or in direct thrust. Examples of gas-dynamic engines as defined are turbojets, ramjets, turboshaft engines, and similar devices.

All such devices operate by modifying the state of the working gas in accordance with the laws of thermodynamics in a series of state transformations which, if steady-state operation is to be achieved (in contrast e.g. to a single, open-ended explosion), must eventually carry the state of the gas back to the starting point, thus constituting a closed cycle. In some cases a segment of the cycle occurs outside of the engine, when for example the working gas is air taken from the atmosphere and later returned to the atmosphere after being variously operated upon by the internal elements of the engine. Since the intake and exhaust pressures are the same and are equal to the external atmospheric pressure, the closing segment of the cycle can be taken to be a constant-pressure transformation. In other cases the working fluid is completely contained within the engine and the cycle is closed by means of some other transformation, e.g. an isothermal transformation in the condenser of a steam engine. Both kinds of cycles are used in gas-dynamic engines as here defined. Accordingly, all gas-dynamic engines are characterized by a thermodynamic cycle comprising at least one segment or transformation in which thermal energy is delivered to the gas (e.g. by burning fuel in it), and one segment, which may or may not be distinct from the other, in which part of the heat content (enthalpy) of the gas is transformed into kinetic energy (e.g. by expanding the gas through a nozzle). The amount of kinetic energy which can be extracted from a moving mass of gas is measured by the so-called stagnation pressure, which is defined as that pressure which the gas would attain if the gas were totally stopped, thus using all the available kinetic energy to decelerate the gas in an adiabatic recompression.

It is well known that the process of heating a gas while it is moving in a duct decreases its stagnation pressure. This process is described in a textbook on thermodynamics by A. H. Shapiro, entitled "The Dynamics and Thermodynamics of Compressible Fluid Flow," New York 1953. In this text this process is described in volume 1, page 199 as follows: "Heating always acts to reduce the stagnation pressure, irrespective of whether the speed is subsonic or supersonic." Heating a moving gas therefore reduces the net amount of available kinetic energy and so acts at cross purposes with the objective of extracting the maximum possible amount of kinetic energy from it, thus resulting in a lowered over-all efficiency for the thermodynamic cycle. The difficulty can be avoided if the heating is done when the fluid is essentially at rest, as is the case in steam boilers, but the difficulty is a very real one where the fluid must move at high velocity while it is being heated because of the very nature of the particular type of engine, as is the case in the combustors of jet engines. In the aforementioned text, in volume 1, page 202, it is stated that:

"This represents a restriction on the capacity of high-output combustors over and above the limitations imposed by the maximum velocity for which a stable flame may be maintained. It is also noteworthy that with the maximum entering speed a loss of stagnation pressure of at least 18 percent is inevitable, entirely apart from the losses caused by friction."

It is the main objective of this invention to overcome the loss of stagnation pressure expected of a gas heated while moving through a duct. It is a further objective of this invention to teach the means whereby the efficiency of a gas dynamic engine can be made higher than heretofore possible, by the exploitation of a higher stagnation pressure in the moving, heated gas.

The invention is based on the discovery that the stagnation pressure of a gas heated while moving in a duct at the speed of sound (Mach 1, $M=1$) does not decrease, but may in fact increase and so the efficiency increases. The statement quoted above from the Shapiro textbook is perfectly true insofar as heating acts to reduce the stagnation pressure, irrespective of whether the speed is subsonic or supersonic, but exception must be taken to the use of the inferential word "always" as quoted in this context: the statement is not true when the velociy is neither subsonic nor supersonic, but exactly sonic. This case is not covered by the equations normally used for computing the change in stagnation pressure (as is done in all published references to the subject, including the Shapiro textbook) because the equations themselves become indeterminate when $M=1$.

Suitable equations that can describe the process of heating a gas at Mach 1 have been developed. A detailed discussion is not appropriate here, but an outline of the approach can be given: since a solution for the equations of steady-state gas flow with enthalpy increase cannot be obtained when $M=1$, the steady-state assumption is temporarily discarded by assuming a train of sound waves propagating in the gas inside the duct, so that small periodic fluctuations of pressure (and therefore Mach number M) are present in the gas stream. The heat delivery process is then superimposed on the pressure fluctuations, and the perturbation of the Mach number due to the sound waves allows the gas to absorb more heat than otherwise possible. Without going here into the mathematical details, it is found in the end that the stagnation pressure is no longer constrained to decrease. as is the case in subsonic or supersonic flow, but may remain unchanged or even increase depending on the specific situation, as determined by the variation of cross-sectional area of the duct and the value of the downstream pressure. In particular, it is found that the stagnation pressure increases if the duct is made slightly divergent, and if the rate of area increase is made just to keep up with the rate of heat delivery along the length of the duct, without either choking the flow or allowing it to expand to a distinctly supersonic condition where the normal decrease of stagnation pressure would apply. It should be noted that heating of the gas while moving at the speed of sound was heretofore believed to be impossible; the process is made possible by the presence of superimposed perturbations (sound waves) which can be either purposely applied to the gas in the duct or result naturally from the turbulence of the boundary layer.

It is not difficult to obtain Mach 1 flow in a duct. This occurs naturally in any convergent-divergent duct operated at a pressure ratio higher than the critical pressure ratio, as is the case in all DeLaval nozzles used in turbines and in all rocket nozzles used for propulsion. In such cases, however, sonic velocity appears only at a definite location within the throat of the nozzle. This location corresponds to a generally curved surface of essentially zero axial extension (See Shapiro textbook, volume 11, pages 830–833). The gas crosses this surface in an exceedingly short time which does not afford the opportunity for any heat transfer to take place. The delivery of a finite amount of heat to the gas is a process requiring a finite interval of time and must take place over a finite length of duct. Whereas it is very easy to obtain sonic speed at some point of the duct, it is very difficult to maintain it over an appreciable distance. In the ideally perfect case it would suffice to insert a length of constant-area duct between the convergent and the divergent sections of the nozzle. In practice, wall friction and the growth of the boundary layer cooperate in altering this simple configuration. Furthermore, when heat is added to the gas, the profile of the duct must be additionally altered to accommodate the change of state of the gas, as discussed above, to induce an increase of stagnation pressure. The exact profile to be used depends of course on the particular distribution of the heat source used, as well as on the secondary effects of friction and boundary layer growth that must be taken in account. This is best done experimentally after a first approximation of the duct profile is theoretically computed.

This and further advantages of the invention can be realized through the reference to the single drawing forming part of this specification.

The invention can be implemented by a structure of the type illustrated in the drawing. In this structure the gas to be heated is delivered from the left by any suitable contrivance (not shown) such as impeller, a compressor, ram action, relative motion of the duct through a stationary gas, etc. The gas encounters first a convergent section 10 where it is accelerated to Mach 1 by an (adiabatic) expansion. The gas then enters a gently diverging duct section 11 wherein heat is delivered to the gas by a suitable source, for example a flame 12 created by burning fuel droplets 13 injected somewhere upstream by a spray nozzle 14. It should be clear however that flame 12 is used only as an example of heat source, and that any other conceivable source of heat capable of imparting thermal energy to the body of gas while it is moving at the speed of sound within duct 11 falls within the scope of this invention, such as, for example, chemical reactions other than combustion, electromagnetic effects, electric arcs, infrared absorption by molecular resonance, fission activity of a gaseous nuclear fuel, etc. Yet another heat source actually used in the experimental development of the device is described in more detail below.

Duct 11 is shaped so as to accommodate the change of state of the gas while maintaining a gas speed equal to the local speed of sound (Mach 1). It should be noted that as the temperature of the gas changes, so does the local speed of sound, and therefore a constant Mach number does not correspond to a constant absolute velocity. On the contrary, the velocity of the gas increases as it proceeds along the duct, because the temperature increases due to the heat absorbed by the gas, and so does the local speed of sound. As long as Mach 1 is maintained constant, the absolute velocity of the gas increases at the same rate. It is this increase of velocity and temperature which accounts mainly for the increase of stagnation pressure experienced by the gas in this process and the resulting increase in engine efficiency.

Duct 11 is followed by a diffuser 15 where part of the kinetic energy of the gas is recovered in the form of increased pressure, so that the pressure at the exit of diffuser 15 is made equal to the pressure at the inlet of the converging section 10. The remainder of the kinetic energy, still possessed by the gas after recompression, is applied to a conventional utilizing means 16 which may be a turbine wheel, or a thrust nozzle attached to the end of diffuser 15. The purpose of diffuser 15 is to undo the change of pressure introduced by the convergent section 10 in order to accelerate the gas to Mach 1. The convergent section 10 and diffuser 15 in combination are used simply to cause the gas to move at the desired speed in sonic section 11 without otherwise affecting, in the ideal case, the conditions at the inlet and at the outlet of the device. Except for the extreme structural simplicity and the good efficiency of a convergent-divergent nozzle-diffuser combination, any other device capable of injecting gas at Mach 1 into sonic section 11 and of recovering it at the exit would be equally acceptable, and falls within the scope of this invention.

Since the stagnation pressure of the moving gas is increased as a consequence of heating in sonic duct 11 and is not otherwise affected (in the ideal case) by adiabatic expansion in section 10 and compression in diffuser 15, it is clear that the device can heat the moving gas without decreasing the stagnation pressure, and in fact can increase it. In a practical (not ideal) case various effects cooperate in reducing the maximum possible increase of stagnation pressure, namely wall friction and any amount of heat delivered to the gas either in converging section 10 or in diffuser 15 or both, where the flow is not sonic. (In fact cooling the gas in the diffuser may yield an additional increase of stagnation pressure.) Any delivery of heat outside of sonic duct 11 decreases the stagnation pressure and is therefore detrimental, hence the distribution of the heat delivery rate along the entire duct must be suitably controlled. From this point of view, and from the point of view of stability, the free flame used above as an example is probably not the best heat source, particularly in a small experimental apparatus. A convenient, if limited, heat source used in the course of the experimental verification of the theory, and possibly useful in large practical engines, is a fine fog of water droplets sprayed in the intake of the duct at a temperature higher than the gas temperature. The droplets, entrained by the gas stream, are carried through the duct. The heat capacity of the water acts as a heat source until the water has cooled, and the gas heated, to an equal temperature at which point heat transfer ceases. The droplets, if fine enough, do not otherwise affect the gas-dynamic processes in the ducts.

An experimental apparatus, built essentially along the lines illustrated in the drawing using air as the working gas and using as a heat source water (hotter than the air) sprayed from a spray nozzle located as shown for nozzle 14, yielded measured increases of the stagnation pressure of the order of 10 percent.

It is apparent that the device here described, by increasing the stagnation pressure and therefore the recoverable kinetic energy of a stream of heated moving gas, can increase the efficiency of any gas-dynamic engine which utilizes the conversion of heat energy into kinetic energy of a moving gas as the basic process for the generation of mechanical energy from primary heat energy. This is true regardless of the particular method used for delivering heat to the gas and/or for recovering and using the increased available kinetic energy of the gas.

What is claimed is:

1. A method for transforming energy in a fluid-dynamic engine including the steps of
   accelerating a fluid through an engine at the speed of sound at sonic speed in the fluid, and then
   imparting energy to the fluid while it is moving at said sonic speed thereby increasing the amount of utilizable kinetic energy of the fluid.

2. A method of operating a gas-dynamic engine as defined in claim 1 including the step of producing sound waves in the gas while it is maintained at sonic speed.

3. A method of operating a gas-dynamic engine including the steps of
   accelerating a gas through an engine at the speed of sound at the sonic speed of the gas,
   imparting energy to the gas while maintaining it at said sonic speed, and
   utilizing the gas after it has had the energy imparted to it.

4. A method of operating a gas-dynamic engine as defined in claim 3 wherein the step of imparting energy to the gas includes heating the gas.

5. A gas-dynamic engine for the transformation of heat energy into mechanical energy comprising
   means for conveying a gas at the speed of sound in said gas,
   means for heating said gas while it is moving at said sonic speed,
   said first mentioned means being constructed and defined to maintain the heated gas at said sonic speed.

6. A gas-dynamic engine as defined in claim 5 including utilization means responsive to said gas.

7. A gas-dynamic engine as defined in claim 5 wherein said first mentioned means comprises a duct having a sonic duct section interposed between a convergent section and a divergent section so that it is successively accelerated to said sonic speed, moved at said sonic speed through the sonic duct and maintained at said sonic speed.

8. A gas-dynamic engine as defined in claim 7 wherein the sonic section has a slight divergence characterized by the rate of area increase related to the rate of heat delivery along the length of the duct without changing the sonic speed of the gas.

9. A gas-dynamic engine as defined in claim 7 including means for producing sound waves in the gas while it is moving at said sonic speed to facilitate the heating of the gas.

References Cited
UNITED STATES PATENTS

| | | | |
|---|---|---|---|
| 2,483,045 | 9/1949 | Harby | 60—39.14XV |
| 2,920,448 | 1/1960 | Coanda | 60—39.49 |
| 3,034,294 | 5/1962 | Brown | 60—270X |
| 3,109,285 | 11/1963 | Smith | 60—59TX |
| 3,355,891 | 12/1967 | Rhodes | 60—270 |

EDGAR W. GEOGHEGAN, Primary Examiner

U.S. Cl. X.R.

60—39.02, 204, 264